US008478521B2

(12) United States Patent
Min et al.

(10) Patent No.: US 8,478,521 B2
(45) Date of Patent: Jul. 2, 2013

(54) METHOD AND TERMINAL FOR PROVIDING A ROUTE IN A NAVIGATION SYSTEM USING SATELLITE IMAGE

(75) Inventors: Hyun-Suk Min, Suwon-si (KR); Hee Jung, Ansan-si (KR); Kwang-Soo Kim, Seoul (KR); Jin-Won Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 683 days.

(21) Appl. No.: 12/043,485

(22) Filed: Mar. 6, 2008

(65) Prior Publication Data
US 2008/0221790 A1    Sep. 11, 2008

(30) Foreign Application Priority Data
Mar. 6, 2007    (KR) .................. 10-2007-0022117

(51) Int. Cl.
*G06F 17/30*    (2006.01)
*G01C 21/00*    (2006.01)

(52) U.S. Cl.
USPC ........... 701/436; 701/540; 701/421; 701/456; 342/357.25; 342/175; 342/179; 342/454; 342/416; 473/407; 473/409

(58) Field of Classification Search
USPC ............. 701/200–215, 533, 532, 469, 2, 120, 701/25, 412, 416, 439, 454, 526, 527; 342/357.25, 357.57, 175, 179, 463; 473/407, 473/409
See application file for complete search history.

(56) References Cited

U.S. PATENT DOCUMENTS

| | | | |
|---|---|---|---|
| 7,199,800 B2* | 4/2007 | Ogawa ......................... | 345/537 |
| 7,746,343 B1* | 6/2010 | Charaniya et al. ............ | 345/428 |
| 2004/0059500 A1* | 3/2004 | Nakano ........................ | 701/211 |
| 2005/0033511 A1* | 2/2005 | Pechatnikov et al. ......... | 701/210 |
| 2005/0049782 A1* | 3/2005 | Nakano ........................ | 701/211 |
| 2008/0027635 A1* | 1/2008 | Tengler et al. ................ | 701/209 |

* cited by examiner

*Primary Examiner* — Thomas Tarcza
*Assistant Examiner* — Adam Tissot
(74) *Attorney, Agent, or Firm* — Jefferson IP Law, LLP

(57) ABSTRACT

A method and a terminal for providing a route in a navigation system using a satellite image are provided. The terminal includes a route calculation unit for calculating a route from a current location to a destination when a user inputs the destination, a satellite image requesting unit for requesting a satellite image server for satellite images corresponding to locations on the route and for downloading the requested satellite images, a satellite image storage unit for storing the downloaded satellite images, and a controller for retrieving a satellite image corresponding to the current location from the satellite image storage unit and for displaying the retrieved satellite image simultaneously while downloading the satellite images corresponding to the locations on the route.

12 Claims, 4 Drawing Sheets

METHOD AND TERMINAL FOR PROVIDING A ROUTE IN A NAVIGATION SYSTEM USING SATELLITE IMAGE

PRIORITY

This application claims the benefit under 35 U.S.C. §119 (a) of a Korean patent application filed in the Korean Industrial Property Office on Mar. 06, 2007 and assigned Serial No. 2007-22117, the entire disclosure of which is hereby incorporated by reference.

BACKGROUND OF THE INVENTION

1. Field of the Invention

The present invention relates to a method and a terminal for providing a route in a navigation system. More particularly, the present invention relates to a method and terminal for providing a route in a navigation system using a satellite image.

2. Description of the Related Art

A car navigation terminal informs the driver of current location information and provides an optimal route from a current location to a desired destination. The terminal also guides the driver according to the optimal route and provides the driver with a variety of information beneficial for driving. One method for effectively providing information about a route includes the displaying of a digital map and informing of a current location on the road using the map.

Meanwhile, an Internet portal server, such as Google, Yahoo and the like, has actively provided a map service based on satellite images. Use of such satellite images enables checking of surroundings or roads, which are not displayed on a conventional two-dimensional map.

As a result, navigation guidance has recently been enhanced with a sense of reality by using these satellite images, which are received from a satellite and are substantially the same as real pictures.

However, in order to display a satellite image on a screen, a navigation terminal must download a satellite image corresponding to a current location from a server via a communication network. In this case, a period of time is required to download a satellite image from the server. Therefore, when a car moves at a high speed, it is difficult to display a satellite image corresponding to a current location on a screen in real time. Even in a case in which the car moves at a low speed, if a period of time is not enough to download a satellite image, it is not possible to display a satellite image in real time and it is difficult to provide a user with accurate guidance information.

That is, a navigation terminal requests a server for a satellite image corresponding to the current location of the navigation terminal in order to receive satellite information. Then, when the current location of the navigation terminal changes, the navigation terminal again requests the server for a satellite image for the changed location. Therefore, it is difficult to display the satellite image in real time.

Therefore, a need exists for a navigation terminal and method for providing a navigation route capable of displaying a satellite image corresponding to a current location in real time.

SUMMARY OF THE INVENTION

An aspect of the present invention is to address at least the above-mentioned problems and/or disadvantages and to provide at least the advantages described below. Accordingly, an aspect of the present invention is to provide a method and a terminal for providing a route in a navigation system, which can acquire a satellite image corresponding to a current location and can display the acquired satellite image in real time.

Another aspect of the present invention is to provide a terminal for downloading necessary satellite images from a satellite image server based on route information, and providing route guidance to a user in real time.

In accordance with an aspect of the present invention, a method for providing a navigation route by using satellite images is provided. The method includes, when a user sets a destination, calculating a route from a current location to a destination, requesting a satellite image server for satellite images corresponding to locations on the route, downloading satellite images corresponding to the route, storing the downloaded satellite images, retrieving a satellite image corresponding to the current location from a satellite image storage unit and displaying the retrieved satellite image simultaneously while downloading the satellite images corresponding to the locations on the route.

In accordance with another aspect of the present invention, a navigation terminal is provided. The terminal includes a route calculation unit for calculating a route from a current location to a destination when a user inputs the destination, a satellite image requesting unit for requesting a satellite image server for satellite images corresponding to locations on the route and for downloading the requested satellite images, a satellite image storage unit for storing the downloaded satellite images, and a controller for retrieving a satellite image corresponding to the current location from the satellite image storage unit and for displaying the retrieved satellite image simultaneously while downloading the satellite images corresponding to the locations on the route.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiment of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations will be omitted for clarity and conciseness.

Figure 1:
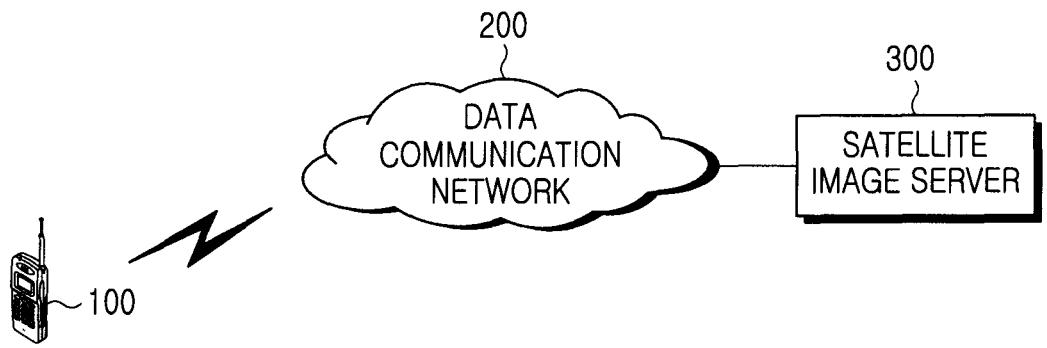
FIG. 1 illustrates a navigation system according to an exemplary embodiment of the present invention.

FIG. 1 illustrates a navigation system according to an exemplary embodiment of the present invention.

Referring to FIG. 1, a navigation terminal 100 connects to the Internet (not shown) through a wireless data communication network 200 such as a wireless Local Area Network (LAN), Wide-band Code Division Multiple Access (WCDMA) and the like, thereby establishing a connection with a satellite image server 300. The data communication network 200 can support the Internet. After connecting to the satellite image server 300, the navigation terminal 100 can download necessary satellite image data from the satellite image server 300 and display the downloaded data for navigation.

Figure 2:
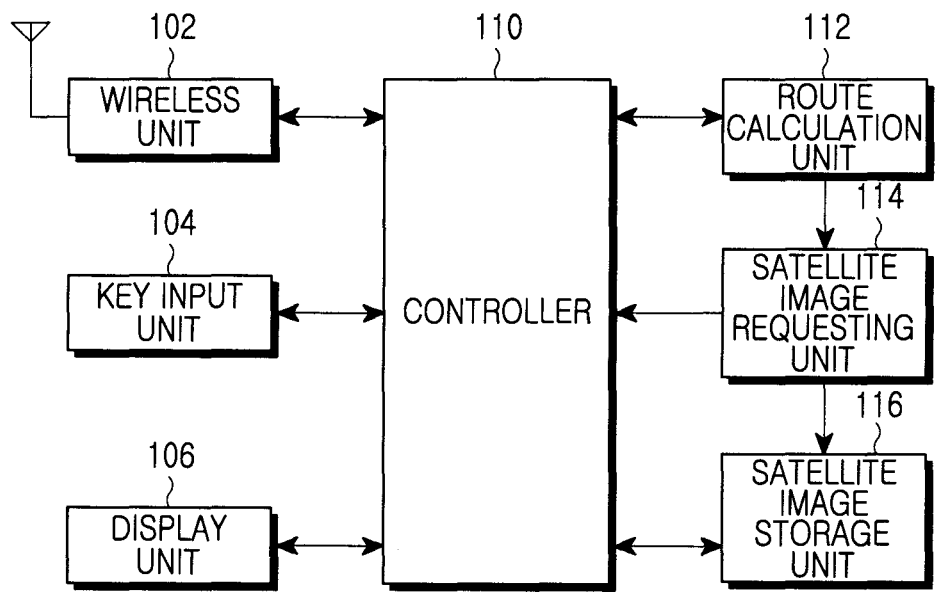
FIG. 2 is a block diagram illustrating a construction of a navigation terminal according to an exemplary embodiment of the present invention.

FIG. 2 is a block diagram illustrating a construction of a navigation terminal according to an exemplary embodiment of the present invention. Referring to FIG. 2, the navigation terminal includes a controller 110, a wireless unit 102, a key input unit 104, and a display unit 106. The controller 110 controls overall operations of the navigation terminal. The wireless unit 102 converts voice data and control data into wireless signals and transmits the converted signals to the data communication network 200. The wireless unit 102 receives wireless signals, for example from the data communication network 200, converts the received wireless signals into voice data and control data, and outputs the converted signals to the controller 110. Therefore, the wireless unit 102 can communicate with the satellite image server 300 through the wireless data communication network 200 such as wireless LAN, WCDMA and the like.

A key input unit 104 may include a plurality of number keys and character keys, and outputs input signals generated by a user's key pressing to the controller 110. A user may input a destination through the key input unit 104 or select a destination displayed on the display unit 106.

The display unit 106 may include a display device such as a Liquid Crystal Display (LCD), and displays navigation screens corresponding to the user input. The display unit 106 may also include a touch screen so as to function as a display and as an input device.

Further, the navigation terminal 100 includes a route calculation unit 112, a satellite image requesting unit 114, and a satellite image storage unit 116. When a user inputs a destination through the key input unit 104, the route calculation unit 112 calculates a route from a current location to the destination. The calculated route information is provided to the controller 110 for providing a navigation service to a user. Also, the calculated route information is provided to the satellite image requesting unit 114. The satellite image requesting unit 114 requests, through the wireless unit 102, the satellite image server 300 for satellite images corresponding to locations on a route from a starting point to a destination point based on the calculated route information. Such satellite images can be displayed at the time of route guidance. The satellite image server 300 transmits corresponding satellite images to the navigation terminal in response to the request for satellite images received from the navigation terminal.

The satellite image server 300 includes a number of image blocks. In an exemplary implementation, all image blocks may have substantially the same data size.

Figure 3:
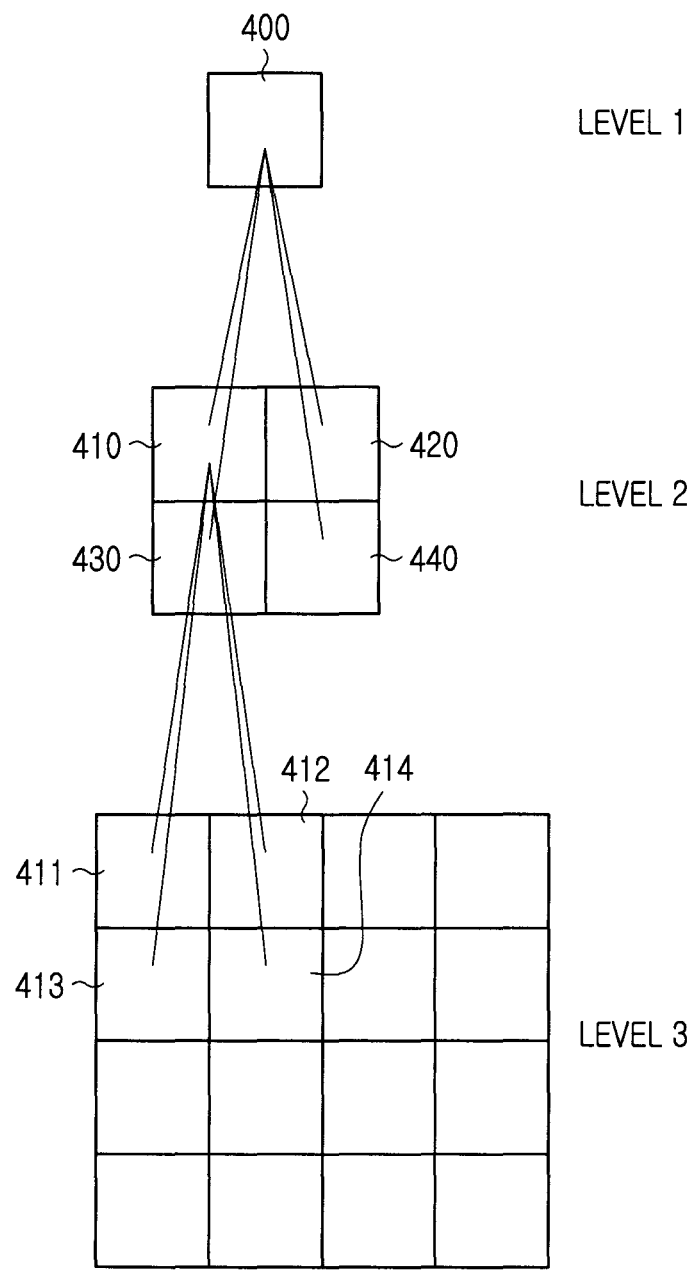
FIG. 3 illustrates a data structure of satellite images stored in a satellite image server according to an exemplary embodiment of the present invention.

FIG. 3 illustrates a data structure of satellite images stored in the satellite image server 300 according to an exemplary embodiment of the present invention.

Referring to FIG. 3, image blocks 400 to 440 and image blocks 411 to 414 can be classified in consecutive resolution levels, according to the height at which the ground is viewed. For example, the image block 400 of resolution level 1 can cover the broadest area for each block, and the image blocks 410, 420, 430 and 440 can cover a part (e.g. ¼) of the area of the image block 400 of resolution level 1. In an exemplary implementation, one image block may have four image blocks that cover an area of the image block. As a resolution level increases in such a manner, each of the image blocks 400 and 410 has a number of child-image blocks 410, 420, 430 and 440 and 411, 412, 413 and 414, respectively.

In an exemplary implementation, a zooming feature may be configured for each of the image blocks so that controller 110 may zoom in or out relative to a displayed image block according to a user input.

According to an exemplary embodiment of the present invention, the satellite image requesting unit 114 requests the satellite image server 300 for image blocks corresponding to the locations on the route.

Figure 4:
FIG. 4 illustrates image blocks corresponding to locations on a navigation route according to exemplary embodiment of the present invention.

FIG. 4 illustrates image blocks corresponding to locations on a navigation route according to an exemplary embodiment of the present invention.

Referring to the left side of FIG. 4, a route from a starting point indicated by a spot to a destination point indicated by reference alphabet "G" is calculated. Referring to the right side of FIG. 4, the satellite image requesting unit 114 requests the satellite image server 300 for image blocks 1 to 11 corresponding to locations on the route. In this case, a process of downloading satellite images from the satellite image server 300 is executed as a background process. More particularly, while the satellite image requesting unit 114 downloads the satellite images from the satellite image server 300, the controller 110 executes a process of guiding a navigation route. The satellite image requesting unit 114 stores the satellite images received from the satellite image server 300 in the satellite image storage unit 116.

In the process of guiding a navigation route, the controller 110 acquires a current location. In this case, the current location may be provided by a sensor (not shown), which may be a Global Positioning System (GPS) or a Gyro/accelerometer (DR). Otherwise, the controller 110 can receive its own location information from a GPS satellite by means of a GPS receiver (not shown). The controller 110 retrieves a satellite image corresponding to the current location from the satellite image storage unit 116 and then displays the retrieved satellite image on the display unit 106. As shown in FIG. 4, the controller 110 can display both the satellite image and a digital map for navigation on the display unit 106 by means of a split screen. Moreover, the controller 110 may overlap and display both the satellite image and the digital map for navigation.

Hereinafter, an exemplary operation of guiding a navigation route by a navigation terminal will be described with reference to FIG. 5.

Figure 5:
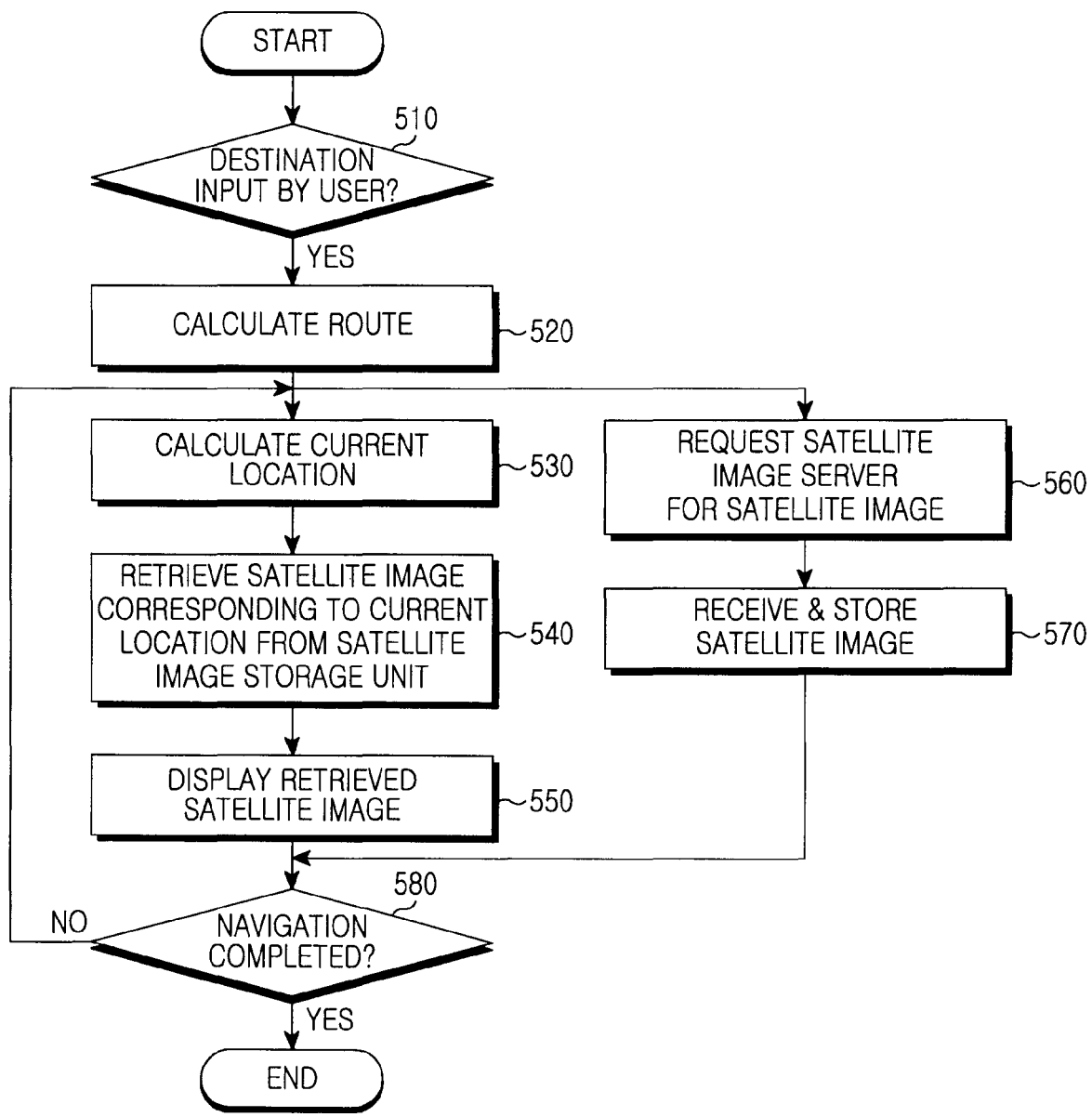
FIG. 5 is a flow diagram illustrating a process of controlling navigation route guidance by a navigation terminal according to an exemplary embodiment of the present invention.

FIG. 5 is a flow diagram showing a process of controlling navigation route guidance by a navigation terminal according to an exemplary embodiment of the present invention.

Referring to FIG. 5, in step 510, the controller 110 determines if a destination is input by a user. As a result of the determination in step 510, when the destination is input by the user, the controller 110 proceeds to step 520 in which the controller 110 calculates a route from a current location to the destination.

For example, referring to FIG. 4, when the user inputs a destination indicated by "G," the controller 110 calculates a route using the route calculation unit 112 and determines image blocks corresponding to the route according to the calculated route information.

As described above, satellite images include a plurality of image blocks mapped to corresponding locations on the route. Under the control of the controller 110, the satellite image requesting unit 114 requests the satellite image server 300 for the plurality of image blocks mapped to the corresponding locations on the route. As an example, the satellite image requesting unit 114 determines coordinates corresponding to the locations on the route and then determines which image blocks to request.

Referring to FIG. 4, eleven image blocks correspond to the route. In step 560, the satellite image requesting unit 114 requests the satellite image server 300 for image block 1 corresponding to a navigation starting point. Then, the satellite image requesting unit 114 sequentially requests the satellite image server 300 for image blocks 2 to 11. In step 570, the satellite image requesting unit 114 receives the satellite images from the satellite image server 300 and then stores the received satellite images in the satellite image storage unit 116.

At the same time, the controller 110 executes a process of navigation route guidance in steps 530 to 580. First, in step 530, the controller 110 calculates a current location of the navigation terminal.

In step 540, the controller 110 retrieves a satellite image corresponding to the current location from the satellite image storage unit 116. In step 550, the controller 110 displays the retrieved satellite image on the display unit 106.

In step 580, the controller 110 determines if the navigation function is completed. As a result of the determination in step 580, when the navigation function is not completed, the controller 110 returns to step 530 in which the controller 110 calculates a current location changed according to the movement of the terminal.

According to exemplary embodiments of the present invention, a terminal capable of receiving satellite images receives a satellite image corresponding to a route during driving, and then performs navigation guidance. That is, according to the present invention, a satellite image server is previously requested for satellite images from a current location to a destination, the satellite images are stored, and then the stored satellite images are displayed to a user simultaneously with navigation guidance. Therefore, according to exemplary embodiments of the present invention, it is possible to effectively implement a navigation function.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A terminal for providing a route in a navigation system using a satellite image, the terminal comprising:
    a route calculation unit for calculating the route from a starting location to a destination when a user inputs the destination;
    a satellite image requesting unit for previously requesting a satellite image server for satellite images corresponding to image blocks showing contiguous segments of the route prior to displaying any of the requested satellite images and for downloading the requested satellite images from the satellite image server, wherein the route is divided into the contiguous segments contiguously extending from the starting location to the destination, each segment corresponding to one of the image blocks stored in the satellite image server;
    a satellite image storage unit for storing the downloaded satellite images; and
    a controller for retrieving, from the satellite image storage unit, a satellite image corresponding to a segment of the route on which the user is presently located and for displaying the retrieved satellite image.

2. The terminal as claimed in claim 1, wherein the controller displays the satellite image together with a digital map for the navigation by means of a split screen.

3. The terminal as claimed in claim 1, wherein the controller displays the retrieved satellite image and zooms in/out according to a user input.

4. The terminal as claimed in claim 1, wherein the satellite image requesting unit first downloads the satellite image corresponding to the segment of the route on which the user is presently located from the satellite image server and then downloads satellite images corresponding to next segments of the route from the satellite image server.

5. The terminal as claimed in claim 4, wherein while the satellite image requesting unit downloads satellite images from the satellite image server and the satellite image storage unit stores the satellite images, the controller retrieves and displays an already stored satellite image corresponding to the segment of the route on which the user is presently located.

6. A method for providing a route in a navigation system using a satellite image, the method comprising:
    calculating the route from a starting location to a destination when a user inputs the destination;
    previously requesting a satellite image server for satellite images corresponding to image blocks showing contiguous segments of the route prior to displaying any of the requested satellite images;
    downloading the requested satellite images, from the satellite server;
    storing the downloaded satellite images in a satellite image storage unit;
    retrieving, from the satellite image storage unit, a satellite image corresponding to a segment of the route on which the user is presently located, wherein the route is divided into the contiguous segments contiguously extending from the starting location to the destination, each segment corresponding to one of the image blocks stored in the satellite image server; and displaying the retrieved satellite image.

7. The method as claimed in claim 6, further comprising displaying the retrieved satellite image together with a digital map for navigation by means of a split screen.

8. The method as claimed in claim 6, wherein the displaying of the retrieved satellite image comprises displaying the retrieved satellite image and zooming in/out according to a user input.

9. The method as claimed in claim 6, wherein the downloading of the satellite images comprises:

downloading the satellite image corresponding to the segment of the route on which the user is presently located from the satellite server; and continuing to download satellite images corresponding to next segments of the route from the satellite server.

10. The method as claimed in claim 9, wherein while the satellite images are downloaded from the satellite server, an already stored satellite image corresponding to the segment of the route on which the user is presently located is retrieved and displayed for navigation.

11. The method as claimed in claim 6, wherein all the requested satellite images are downloaded from the satellite image server prior to displaying any of the requested satellite images.

12. The terminal as claimed in claim 1, wherein the satellite image requesting unit downloads all the requested satellite images from the satellite image server prior to displaying any of the requested satellite images.

* * * * *